April 6, 1954   W. E. JOHNSON ET AL   2,674,652
METHOD OF AND APPARATUS FOR DEFINING CHARACTERS
ON IMPRESSION RECEIVING MATERIAL
Filed July 10, 1951   8 Sheets-Sheet 1

Inventors
William E. Johnson
Alexander J. Munro
By
Attorney

Inventors
William E. Johnson
Alexander J. Munro
By
Attorney

Inventors
William E. Johnson
Alexander J. Munro
By
Attorney

April 6, 1954   W. E. JOHNSON ET AL   2,674,652
METHOD OF AND APPARATUS FOR DEFINING CHARACTERS
ON IMPRESSION RECEIVING MATERIAL
Filed July 10, 1951   8 Sheets-Sheet 7

Inventors
William E. Johnson
Alexander J. Munro
By
Attorney

April 6, 1954 W. E. JOHNSON ET AL 2,674,652
METHOD OF AND APPARATUS FOR DEFINING CHARACTERS
ON IMPRESSION RECEIVING MATERIAL
Filed July 10, 1951 8 Sheets-Sheet 8

FIG. 9.

Inventors
William E. Johnson
Alexander J. Munro
By
Attorney

Patented Apr. 6, 1954

2,674,652

UNITED STATES PATENT OFFICE 2,674,652

METHOD OF AND APPARATUS FOR DEFINING CHARACTERS ON IMPRESSION RECEIVING MATERIAL

William Edward Johnson, Streatham, London, and Alexander John Munro, South Norwood, London, England, assignors to Powers-Samas Accounting Machines Limited, London, England, a British company Application July 10, 1951, Serial No. 236,048

Claims priority, application Great Britain July 14, 1950

17 Claims. (Cl. 178—23)

This invention relates to an improved method of and apparatus for defining characters on impression receiving material.

It is a main object of the invention to provide a method of and apparatus for automatically effecting the defining of characters on impression receiving material, e. g. paper, at a relatively high speed, and in carrying the invention into effect one or more styluses is or are employed. By a "relatively high speed" is to be understood the capacity of a stylus, or of each stylus, to define characters at a rate of 150 or more characters per minute.

According to the invention, there is provided a method of defining on impression receiving material, e. g. paper, characters each having a maximum height and a maximum width, consisting of the steps of moving impression receiving material in one direction at a linear speed which determines one maximum dimension of a character, reciprocating the marking end only of a stylus in a direction normal to the direction of movement of the impression receiving material and in a path which determines the other maximum dimension of the character, and applying impulses to the stylus during reciprocation thereof thereby to effect axial movement of the stylus causing it to make a character defining mark on the impression receiving material.

In one method according to the invention a transfer media for example a carbon ribbon or the like, is interposed between the stylus and the impression receiving material, whereby the character defined by the stylus is transferred from the transfer media to the impression receiving material.

The invention also contemplates apparatus for carrying said method into effect.

In order that the invention may be clearly understood one embodiment thereof will now be described, by way of example, with reference to the accompanying diagrammatic drawings, in which.

Like reference numerals refer to like parts throughout the various figures of the drawings.

Figure 5:
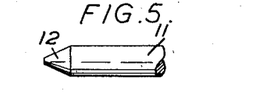

Referring to the drawings, the machine diagrammatically illustrated therein embodies a plurality of styluses each of which consists of a needle-like element in the form of a thin steel rod 11 having a pointed marking end. The end of the rod, however, is not a sharp point but is a flattened point of small diameter as indicated at 12, Fig. 5. If desired, however, the end may be rounded. The styluses are slidably mounted in guides 13, Fig. 1A and 2A, secured to the bed 14 of the machine, for axial movement towards and away from the face of a platen comprising a rigid bar 15 secured to a frame 16 mounted on the bed 14.

Figure 1A:
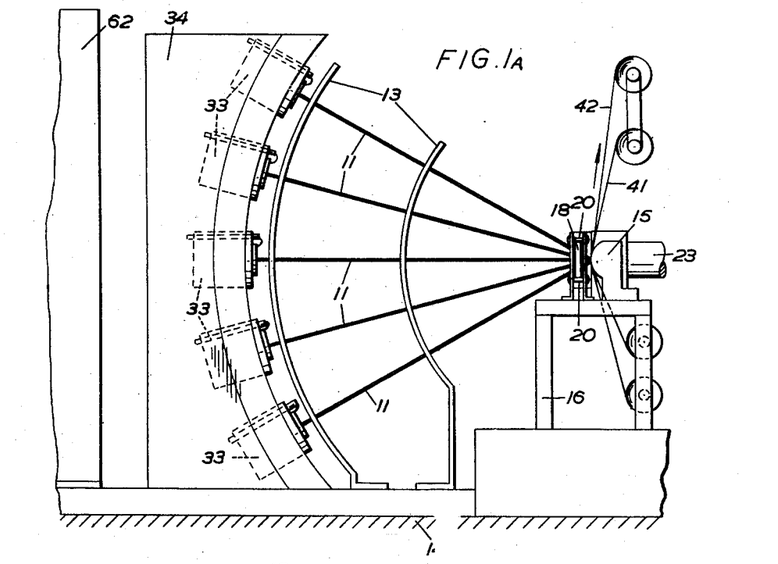
Figs. 1A, 1B, and 1C together illustrate a broken side elevation of a record card controlled machine for printing data sensed from perforated record cards, Figs. 2A, 2B, and 2C together are a plan of Figs. 1A, 1B, and 1C.
Figure 2A:
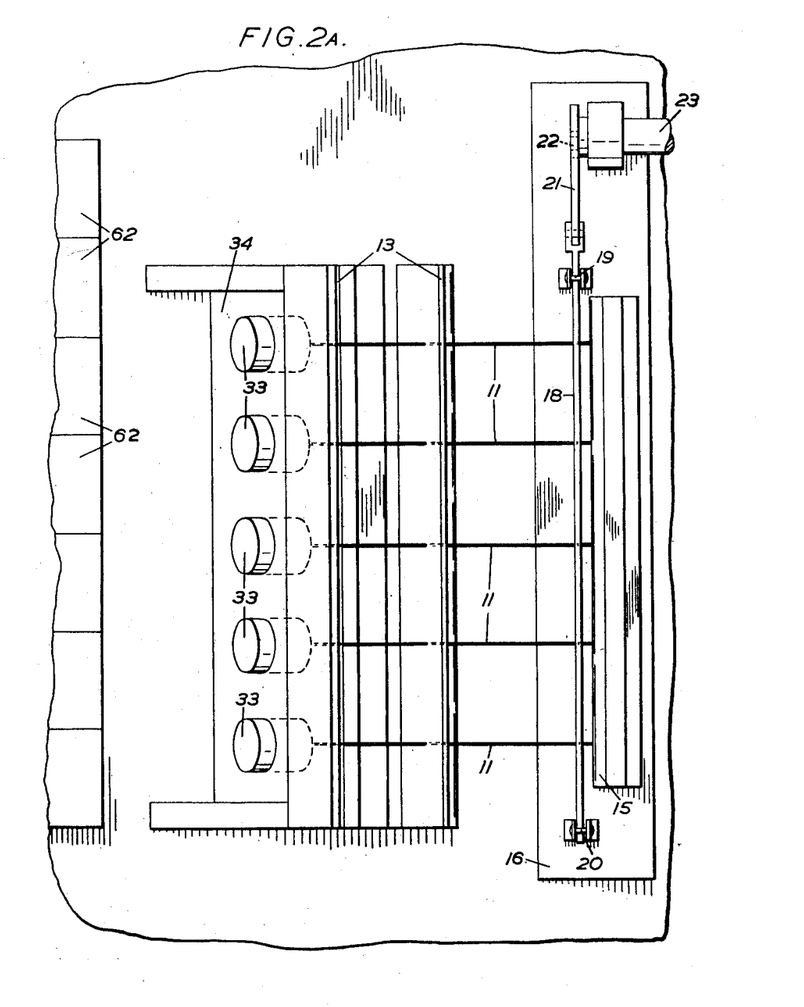
Figure 3:
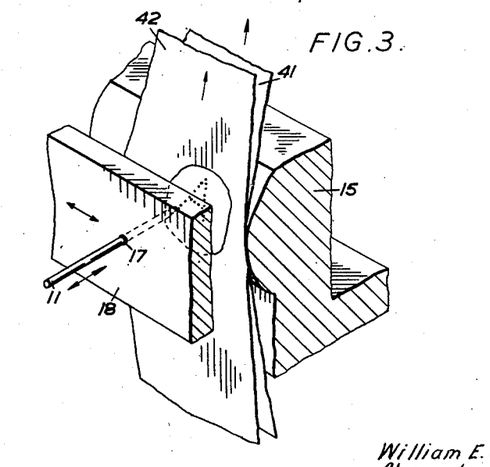
Fig. 3 is a broken perspective illustrating the operation of a printing stylus.
Figure 7:
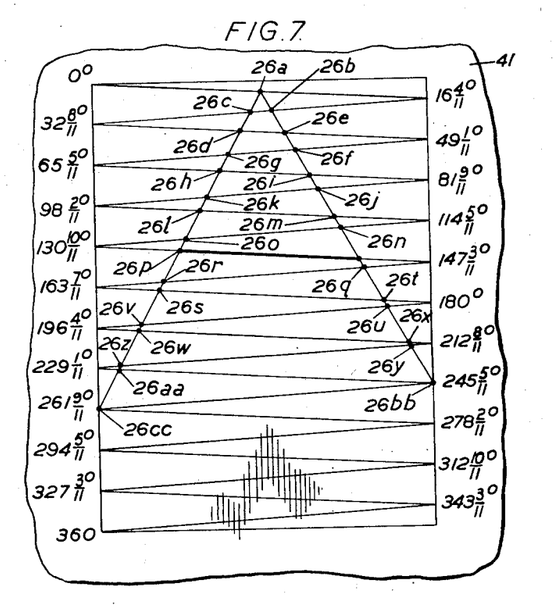
Fig. 7 graphically illustrates the manner in which, under control of the disc shown in Fig. 6, a stylus defines the letter "A" on impression receiving material.

The styluses are so supported that the marking ends thereof are free for reciprocation in a direction extending lengthwise of the platen 15 and to this end the marking ends of the styluses are arranged to protrude through holes 17, Fig. 3, in a reciprocating member comprising a bar or plate 18 guided for lengthwise movement in fixed guides 19, 20, Figs. 1A and 2A. The reciprocating member 18 is connected by an eccentric strap 21, Fig. 2A, and an eccentric 22 to a shaft 23 driven by a pulley 24 and belt 25, Figs. 1B and 2B, and an electric motor, not shown, and the eccentric throw is such that the amplitude of reciprocation imparted to the marking end of each stylus by the member 18 is equal to the maximum width of a character to be defined thereby as illustrated in Fig. 7. In Figs. 1A and 2A there is shown a printing head comprising twenty-five styluses 11, the styluses being arranged in the head in five rows each containing five styluses, only one such row being shown in Fig. 2A. The styluses are so disposed in the head that their marking ends will all impinge against the centre of the platen as shown in Fig. 1A.

Figure 1B:
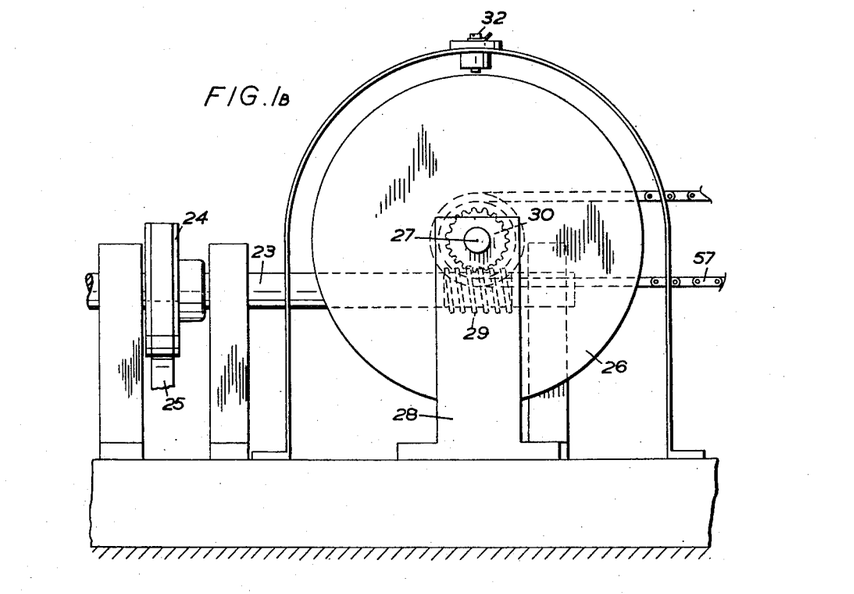
Figure 2B:
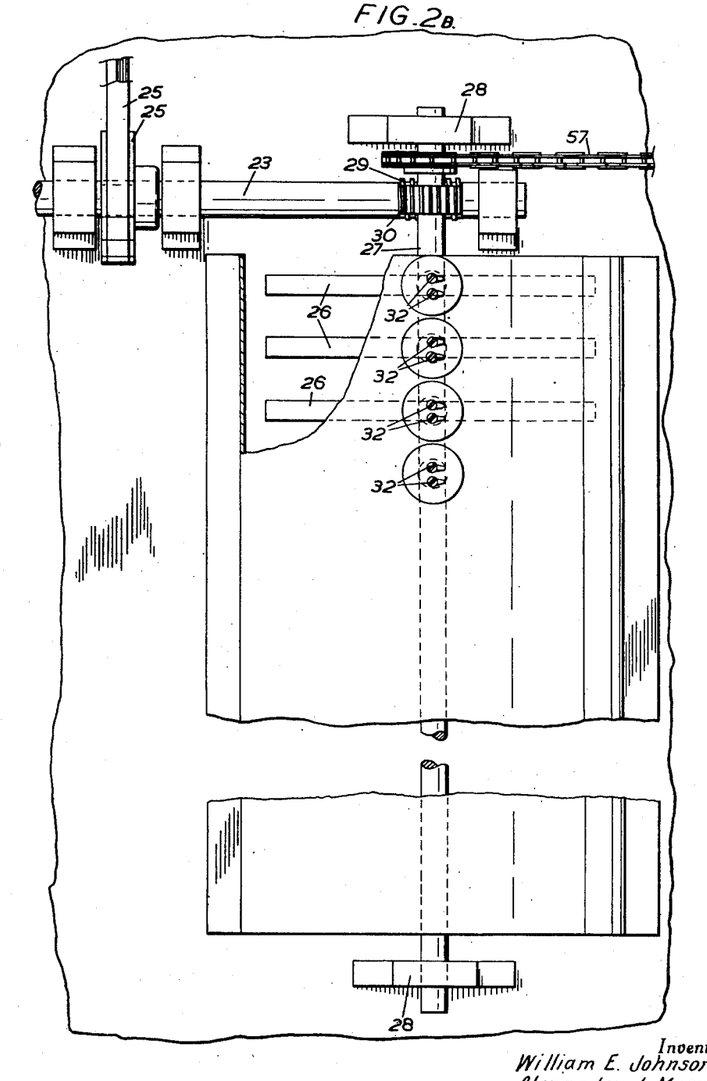
Figure 6:
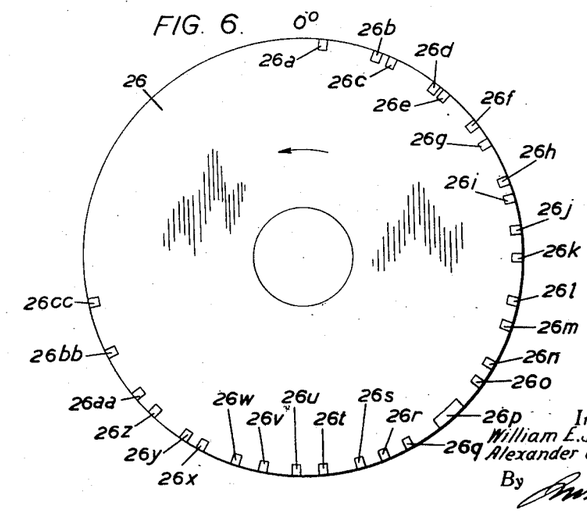
Fig. 6 illustrates a character determining disc for the letter "A,"

A plurality, for example thirty-nine, of character determining discs 26, Figs. 1B, 2B, and 6, are mounted for simultaneous rotation with a shaft 27 rotatable in bearings 28 secured to the bed 14 and the shaft 27 is rotated in synchronism with the eccentric 22 by reduction gearing 29, 30 of which gear 29 is secured to the shaft 23.

Figure 4:
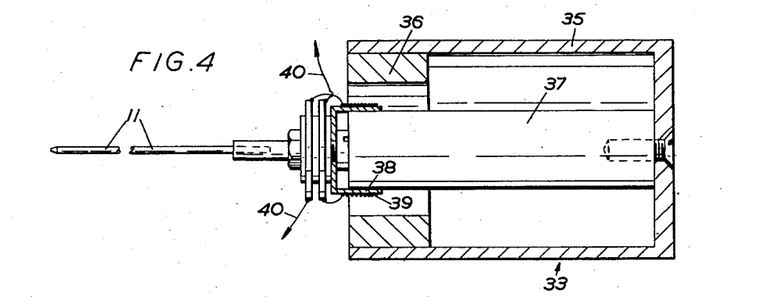
Fig. 4 illustrates, partly in section, a stylus and actuating means for effecting axial movements of the stylus towards a platen, Fig. 5, to an enlarged scale, illustrates the marking end of a stylus.

Around the periphery of each character determining disc 26 are disposed a plurality of electrical contacts, and in Fig. 6 for the character A these are shown as 26a—26cc. For each disc 26 a pair of electrical brushes 32 is disposed so as to engage the peripheries of the character determining discs and successively to engage the contacts on rotation of the discs. As can be seen from Fig. 6, the contacts are so spaced around the periphery of a disc that at predetermined intervals electric circuits are completed by the engagement of the brushes with the contacts so that electrical impulses are imparted to actuating means 33, Figs. 1A, 2A, and 4, for effecting axial movement of the styluses 11 towards the platen 15. The actuating means 33 are supported in a head 34 secured to the bed 14 and, as illustrated in Fig. 4, each actuating means comprises a casing 35 housing a pole piece 36 and a permanent magnet 37. A former 38 slidably mounted on the outer end of the permanent magnet 37, is located in the air gap of the permanent magnet assembly, and has a coil 39 wound therearound, the coil 39 being connected by wires 40 to one of the brushes 32 of each of the discs 26. Each stylus 11 is secured to its former 38 for axial movement therewith, as illustrated in Fig. 4, so that the stylus is reciprocated axially towards the platen 15 at intervals under the control of a character defining disc 26 and is thereby caused to define a character by forming a pattern of small dots, and in some instances of lines, on impression receiving material which, in the manner described below, is moved between the marking end 12 of the stylus and the platen.

As illustrated in the drawings, the impression receiving material comprises a web of paper 41, Figs. 1A and 3, fed by known paper feeding mechanism, not shown, in a manner such that it is moved at a constant linear speed between the marking end 12 of the stylus and the platen 15 to determine the height of the character defined by the stylus. Together with the paper web 41 there is simultaneously fed a transfer medium in the form of a carbon ribbon 42 or the like and when the stylus 11 receives an impulse which moves it axially, it is impinged against the marking ribbon so that a small dot or line, according to the duration of the impulse as determined by the contacts on a disc 26, is impressed on the paper by transfer from the transfer medium. It is to be understood that the axial movement of the stylus is very short and the stylus returns to its starting position by rebounding.

Figs. 6 and 7 respectively illustrate a character determining disc 26 to control the actuating means 33, Figs. 1A, 2A and 4, for a stylus to form the letter A and the manner in which, under control of the disc, the letter A is formed by the stylus. In Fig. 7 the two vertical lines indicate the end positions of the stroke of the point 12 of a stylus disc to the reciprocation thereof by the plate 18 and the sloping lines indicate the approximate path traced in space by the point 12 relative to the paper web 41 due to the movement thereof at a constant linear speed as aforesaid. As can be seen from Fig. 7, the end positions of the point 12 are so selected that for one revolution of a disc 26 twenty-two paths are traced in space by the point relative to the paper web. Of these twenty-two paths sixteen are employed for the formation of a character and the remaining six are blank and represent the interval during which, in the machine being described, a card is sensed and decoding is effected of data sensed from the card.

The electrical contacts 26a—26cc are so disposed around the periphery of the disc 26 that at intervals and for periods determined thereby the coil 39 is energised and causes the point 12 to impinge against the marking ribbon 42 so that, according to the length of a contact, a dot or a line is marked on the paper web 41. In Figs. 6 and 7 the reference numerals 26a—26cc indicate the contacts and the dots or lines marked as a result thereof, the contacts 26p resulting in the marking of a line. It will, of course, be readily understood that, in known manner, the paper feeding means is provided with suitable adjusting means so that by varying the linear speed of the paper the height of the character to be defined may be varied.

Figure 9:
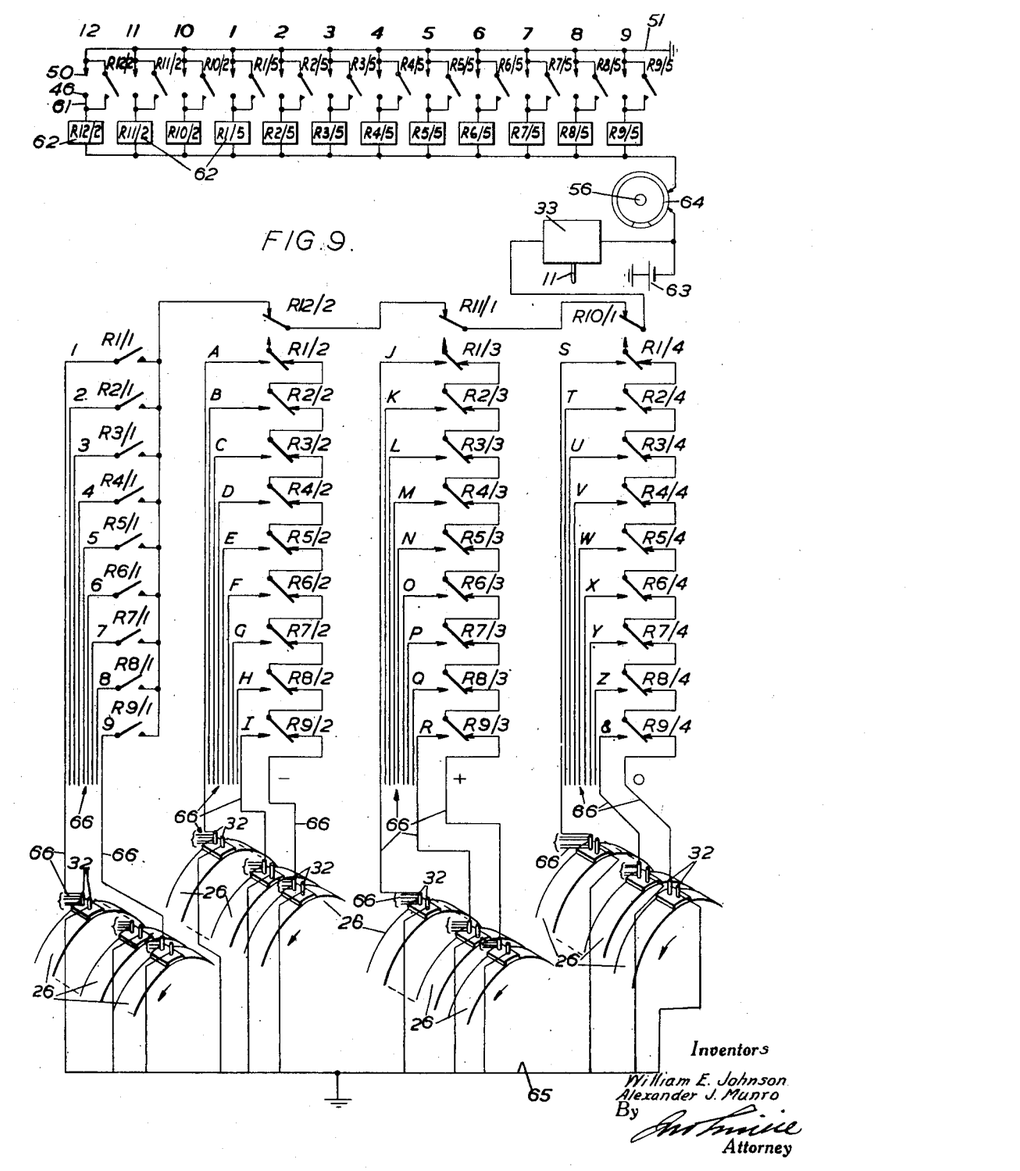
Fig. 9 is a circuit diagram illustrating, for one card column only, the manner in which character selection is effected.

In the foregoing there has been described the manner in which an individual character is formed by a stylus 11, it will, however, be understood that by the provision of suitable character determining discs 26 each stylus may be selectively controlled to form any one of a number of predetermined characters. For purposes of illustration it is assumed that printing is to be effected as the direct result of sensing perforated statistical record cards and that each stylus is capable of forming, under control of the set of discs 26, any one of thirty-nine characters consisting, as shown in Fig. 9, of the twenty-six letters of the alphabet, the numerals 1 to 9 and four selected characters consisting of an ampersand, a plus sign, a minus sign, and a zero. To this end, in known manner, data other than that representative of the numerals 1 to 9 is punched in a card according to a two hole code and for the purpose of illustration it is assumed that cards are to be used in which there are twelve data positions for each vertical column of a card, representative of the numbers 1 to 12. Thus in any card column a hole punched alone in any of the data positions Nos. 1 to 9 has its normal identity but when a hole is punched in one of these positions in combination with a hole in either the No. 10, No. 11, or the No. 12 position the two holes represent a predetermined character. This is illustrated in Fig. 9 which shows, for one column only, selecting means for decoding data sensed from a single card column and selecting, for that column, the stylus to be operated. It will, however, be understood that like circuits are provided for each of the other card columns from which data sensed is to be printed by apparatus as described above. The columnar connections will, however, be explained in greater detail below.

Figure 1C:
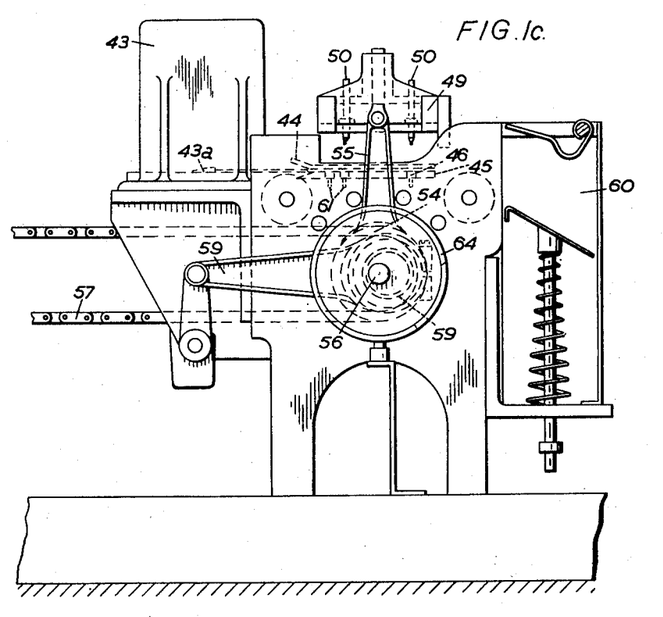
Figure 2C:
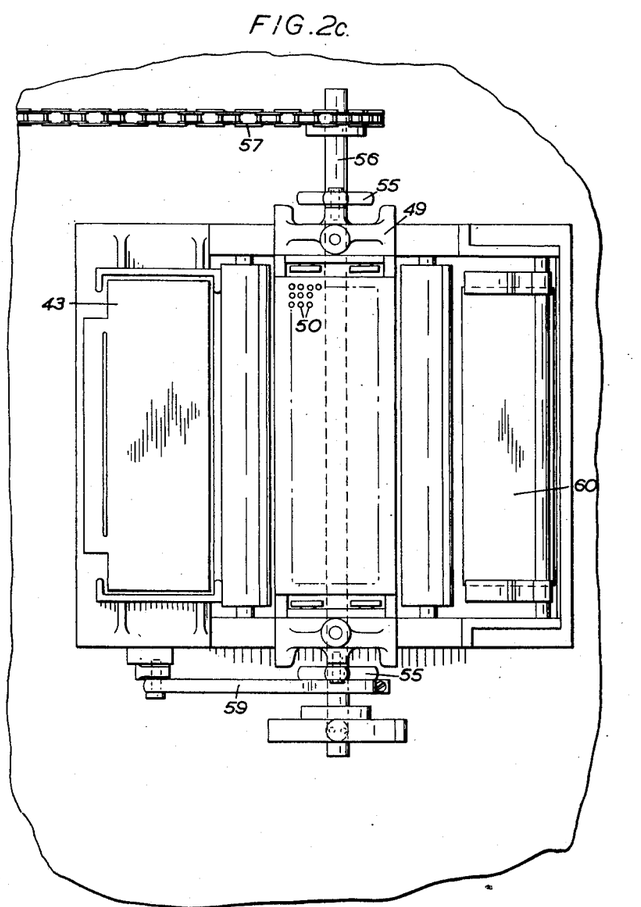
Figure 8:
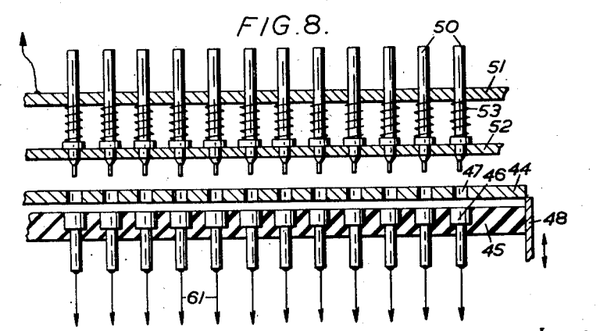
Fig. 8 shows, to an enlarged scale, a part of a record card sensing apparatus illustrated in Fig. 1C.

Referring to Figs. 1C, 2C, and 8, perforated record cards are placed in a magazine 43 from which they are fed one at a time in known manner by a picker 43a, into a sensing chamber formed by a perforated top plate 44 and a bottom plate 45 formed from insulating material and provided with inserts 46, Fig. 8, of conducting material disposed in alignment with the perforations 47 in the plate 44. A stop 48, operated in known manner, locates a card in position for sensing within the sensing chamber and sensing is effected by a sensing head 49 supporting sensing pins 50 guided for axial movement by guide plates 51, 52 against the action of springs 53.

The sensing head 49 is disposed above the sensing chamber and is reciprocated towards and away from the chamber by eccentrics 54 and eccentric straps 55. The eccentrics 54 are rotatable with a cross shaft 56 driven by a chain 57 from the shaft 27. Also rotatable with the cross shaft 56 is a further eccentric 58 operating an eccentric strap 59 which, in known manner, actuates the picker 43a for the magazine 43. When sensing has been effected the card is delivered in known manner into a receiver 60.

When the sensing head 49 is lowered those sensing pins 50 which are aligned with perforations in the card pass through the card and engage inserts 46 thus via leads 61 completing electrical circuits to the selecting means comprising relays 62 of which there is one for each card data position as indicated, for one column only, by the references R1/5, R2/5 ... R12/2, Fig. 9, the numeral following the oblique stroke indicating, as is customary, the number of contacts on the relay. In Fig. 9, also as is customary, the order of connection of the contacts for the column is indicated by reference to the particular relay followed by the number of the contact on the relay, for example R12/1 or R9/4.

It will be understood that the relays R12, R11, and R10 each have only two contacts of which the No. 2 contacts are normally open holding contacts and the No. 1 contacts are in circuit with certain contacts of the relays R1 to R9, and their normal positions are as shown in Fig. 9. On relays R1 to R9 all the contacts are normally open and the No. 5 contacts are holding contacts.

The circuit is supplied with current from source 63, Fig. 9, and a cam 64, Figs. 1C and 9, on cross shaft 56 is operative to release the relays once per cycle.

Let it now be assumed that in the column illustrated a sensing pin 50 passes through a hole in the No. 1 position, this being the only hole punched in this column of the card. The sensing pin 50 engages its insert 46 and so, as the cam 64 is at this time closing the circuit, current passes from source 63 to relay R1 thus closing the holding contact R1/5 and contact R1/1. This permits current pulses to flow to the coil 39 for the stylus 11 for the column sensed via the character determining disc 26 for the character "1," contact R1/1 and closed contacts R12/1, R11/1, R10/1.

As a further example let it be assumed that the sensing pins of the column sense two holes in a card, one in the No. 11 position and the other in the No. 4 position representing, according to the code shown in Fig. 9, the character M. The pins 50 engage these inserts 46 and, as the cam 64 is closing the circuit, the relays R11 and R4 are energised. The holding contacts R11/2 and R4/5 are closed, the contact R11/1 is reversed, and contact R4/3 is closed. This permits current pulses to flow to the coil 39 from disc 26 for character "M" via contacts R4/3, R11/1, and R10/1 so that the stylus defines the letter "M."

It will be understood, as is diagrammatically illustrated in Fig. 9, that for each of the thirty-nine character defining discs there are two brushes 32 one of which is connected to a common lead 65, Fig. 9, to earth and from the other there are leads 66 one to each like contact in each column of relays. Thus, if in two or more card columns there are sensed perforations representative of the same character the disc 26 appropriate thereto will simultaneously permit impulses to be sent to the coils 39 of the styluses 11 for each of those columns.

Although in the foregoing description, the character determining disc has been described as provided with electrical contacts around the periphery thereof, it is to be understood that, if desired, such discs may be replaced by drums or the like having magnetically imprinted spots to control the impulses to the coil 39 or, if desired, the character determining disc may be provided with conducting passages capable of carrying a very small and low pressure electric current which is passed towards the electro-magnet through an amplifier which steps up the current to generate an impulse sufficient to actuate the coil 39. Further, as will be well understood in the art, card sensing means other than sensing means such as is herein described may be employed to actuate the relays 62.

The stylus has been described above as a needle-like element defining characters on the impression receiving material in co-operation with a transfer medium. It is to be understood, however, that if desired the stylus may be of a form other than that described and may comprise a stylus which is provided with marking material so that it makes an impression by direct contact with the impression receiving material. When this form of stylus is employed a transfer medium of the kind described above is not needed. Thus the stylus may comprise a tube housing a thin wick to which marking fluid is fed, to effect the dotted impressions on the paper.

It will also be understood that although in the embodiment of the invention described herein with reference to the accompanying drawings the selector means have been described as being operated as the result of electrical impulses resulting from the sensing of data from a statistical record card, the impulses to the selector means may be initiated by means other than the sensing of a record card. Thus, for example, as will be well understood in the art, the impulses to the selector means may be initiated by elements of a punch unit of a summary punch operated by a tabulating machine or by elements of a result indicating unit of a multiplying machine.

We claim:

1. For defining characters on impression receiving material, e. g. paper, apparatus comprising in combination a platen, a stylus mounted for axial movement towards and away from the platen, a reciprocating member engaging the stylus to reciprocate the marking end thereof lengthwise of the platen in a straight line path the length of which determines the maximum width of a character to be defined by the stylus, actuating means to effect said axial movement of the stylus during reciprocation thereof by the reciprocating member, a plurality of character determining elements movable simultaneously and in synchronism with said reciprocating member to control the operation of said actuating means and thereby cause said stylus to make character defining marks on impression receiving material fed between the stylus and the platen, feeding means to feed impression receiving material between the platen and the stylus at a constant linear speed which determines the height of a character to be defined by the stylus, and selector means to determine which character determining element is conditioned to control the operation of said actuating means.

2. For defining characters on impression receiving material, e. g. paper, apparatus comprising in combination a platen, a stylus mounted for axial movement towards and away from the platen, a reciprocating member engaging the stylus to reciprocate the marking end thereof lengthwise of the platen in a straight line path the length of which determines the maximum width of a character to be defined by the stylus, a permanent magnet assembly, a coil-wound former fixed to said stylus and slidable freely in the air gap of said permanent magnet assembly, a plurality of character determining discs, one for each character to be defined, simultaneously rotatable about an axis common thereto, means to rotate said discs in synchronism with the movements of said reciprocating member, electrical contacts spaced around the periphery of each said disc to determine the intervals at which electrical impulses are imparted to said coil-wound former, selector means including electrical relays to determine which character determining disc is conditioned to transmit an electrical impulse to said former, a pair of electrical brushes engaging the periphery of each said disc, one brush of each pair being connected to earth and the other to said coil-wound former through said relays, and feeding means to feed impression receiving material between the platen and the stylus at a constant linear speed which determines the height of a character to be defined by the stylus.

3. For defining characters on impression receiving material, e. g. paper, apparatus comprising in combination a platen, a stylus mounted for axial movement towards and away from the platen, a reciprocating member engaging the stylus to reciprocate the marking end thereof lengthwise of the platen in a straight line path the length of which determines the maximum width of a character to be defined by the stylus, actuating means to effect said axial movement of the stylus during reciprocation thereof by said reciprocating member, a plurality of character determining elements movable simultaneously and in synchronism with said reciprocating member to control the operation of said actuating means and thereby cause said stylus to make character defining marks on impression receiving material fed between the stylus and the platen, feeding means to feed impression receiving material between the platen and the stylus at a constant linear speed which determines the height of a character to be defined by the stylus, means to interpose transfer media between the marking end of the stylus and impression receiving material fed by said feeding means, and selector means to determine which character determining element is conditioned to control the operation of said actuating means.

4. For defining characters on impression receiving material, e. g. paper, apparatus comprising in combination a platen, a stylus mounted for axial movement towards and away from the platen, a reciprocating member engaging the stylus to reciprocate the marking end thereof lengthwise of the platen in a straight line path the length of which determines the maximum width of a character to be defined by the stylus, actuating means to effect said axial movement of the stylus, during reciprocation thereof by said reciprocating member a plurality of character determining elements movable simultaneously and in synchronism with said reciprocating member to control the operation of said actuating means and thereby cause said stylus to make character defining marks on impression receiving material fed between the stylus and the platen, feeding means to feed impression receiving material between the platen and the stylus at a constant linear speed which determines the height of a character to be defined by the stylus, a marking ribbon for disposition between the marking end of the stylus and impression receiving material fed by said feeding means, said ribbon being movable in the same direction as and in timed relation with said impression receiving material, and selector means to determine which character determining element is conditioned to control the operation of said actuating means.

5. For defining characters on impression receiving material, e. g. paper, apparatus comprising in combination a platen, a stylus mounted for axial movement towards and away from the platen, said stylus consisting of a needle-like element having a non-pointed marking end, a reciprocating member engaging the stylus to reciprocate the marking end thereof lengthwise of the platen in a straight line path the length of which determines the maximum width of a character to be defined by the stylus, actuating means to effect said axial movement of the stylus during reciprocation thereof by said reciprocating member, a plurality of character determining elements movable simultaneously and in synchronism with said reciprocating member to control the operation of said actuating means and thereby cause said stylus to make character defining marks on impression receiving material fed between the stylus and the platen, feeding means to feed impression receiving material between the platen and the stylus at a constant linear speed which determines the height of a character to be defined by the stylus, and selector means to determine which character determining element is conditioned to control the operation of said actuating means.

6. For defining characters on impression receiving material, e. g. paper, apparatus comprising in combination a platen, a stylus mounted for axial movement towards and away from the platen, said stylus consisting of a needle-like element having a non-pointed marking end, a reciprocating member engaging the stylus to reciprocate the marking end thereof lengthwise of the platen in a straight line path the length of which determines the maximum width of a character to be defined by the stylus, a permanent magnet assembly, a coil-wound former fixed to said stylus and slidable freely in the air gap of said permanent magnet assembly, a plurality of character determining discs, one for each character to be defined, simultaneously rotatable about an axis common thereto, means to rotate said discs in synchronism with the movements of said reciprocating member, electrical contacts spaced around the periphery of each said disc to determine the intervals at which electrical impulses are imparted to said coil-wound former, selector means including electrical relays to determine which character determining disc is conditioned to transmit an electrical impulse to said former, a pair of electrical brushes engaging the periphery of each said disc, one brush of each pair being connected to earth and the other to said coil-wound former through said relays, and feeding means to feed impression receiving material between the platen and the stylus at a constant linear speed which determines the height of a character to be defined by the stylus.

7. For defining on impression receiving material, e. g. paper, characters each having a maximum height and a maximum width, apparatus comprising a platen, a stylus supported for axial movement towards the platen, a reciprocating member engaging the stylus to reciprocate the marking end thereof lengthwise of the platen in a path which determines one maximum dimension of a character to be defined by the stylus, feeding means to feed impression receiving material between the platen and stylus with a linear speed determining the other maximum dimension of the character, actuating means to effect axial movement of the stylus during reciprocation thereof by the reciprocating member, and a character defining element operable in synchronism with the reciprocating member to control operation of the actuating means.

8. For defining on impression receiving material, e. g. paper, characters each having a maximum height and a maximum width, apparatus comprising a platen, a stylus supported for axial movement towards the platen, a reciprocating member engaging the stylus to reciprocate the marking end thereof lengthwise of the platen in a path which determines one maximum dimension of a character to be defined by the stylus, feeding means to feed impression receiving material between the platen and stylus with a linear speed determining the other maximum dimension of the character, actuating means to effect said axial movement of the stylus during reciprocation thereof by the reciprocating member, character defining elements operable simultaneously and in synchronism with said reciprocating member to control operation of the actuating means, and selector means to select a character defining element to control the actuating means.

9. For defining on impression receiving material, e. g. paper, characters each having a maximum height and a maximum width, apparatus comprising a platen, a stylus supported for axial movement towards the platen, a reciprocating member engaging the stylus to reciprocate the marking end thereof lengthwise of the platen in a path which determines one maximum dimension of a character to be defined by the stylus, feeding means to feed impression receiving material between the platen and stylus with a linear speed determining the other maximum dimension of the character, actuating means including a permanent magnet assembly having a coil-wound former slidable freely in the air gap of said assembly to effect axial movement of the stylus during reciprocation thereof by the reciprocating member, character defining elements operable simultaneously and in synchronism with said reciprocating member to control operation of the actuating means, and selector means to select a character defining element to control the actuating means.

10. For defining on impression receiving material, e. g. paper, characters each having a predetermined maximum height and maximum width, apparatus comprising a thin steel stylus supported for axial movement, a platen towards which said stylus is axially movable, a reciprocating member engaging the stylus at a position adjacent to the marking end thereof and reciprocating said marking end lengthwise of the platen in a path which determines one maximum dimension of a character, feeding means to feed impression receiving material between the platen and stylus with a linear speed determining the other maximum dimension of the character, a restraining element co-operating with the stylus to restrain against substantial movement, other than axial, portions of the stylus other than the marking end thereof, actuating means to effect said axial movement of the stylus during reciprocation thereof by the reciprocating member, and a character defining element operable in synchronism with the reciprocating member to control operation of the actuating means.

11. For defining on impression receiving material, e. g. paper, characters each having a predetermined maximum height and maximum width, apparatus comprising a thin steel stylus supported for axial movement, a platen towards which said stylus is axially movable, a reciprocating member engaging the stylus at a position adjacent to the marking end thereof and reciprocating said marking end lengthwise of the platen in a path which determines one maximum dimension of a character, feeding means to feed impression receiving material between the platen and stylus with a linear speed determining the other maximum dimension of the character, a restraining element cooperating with the stylus to restrain against substantial movement, other than axial, portions to the stylus other than the marking end thereof, actuating means to effect said axial movement of the stylus during reciprocation thereof by the reciprocating member, character defining elements operable simultaneously and in synchronism with said reciprocating member to control operation of the actuating means, and selector means to select a character defining element to control the actuating means.

12. For defining on impression receiving material, e. g. paper, characters each having a predetermined maximum height and maximum width, apparatus comprising a thin steel stylus supported for axial movement, a platen towards which said stylus is axially movable, a reciprocating member engaging the stylus at a position adjacent to the marking end thereof and reciprocating said marking end lengthwise of the platen in a path which determines one maximum dimension of a character, feeding means to feed impression receiving material between the platen and stylus with a linear speed determining the other maximum dimension of the character, a restraining element co-operating with the stylus to restrain against substantial movement, other than axial, portions of the stylus other than the marking end thereof, actuating means including a permanent magnet assembly having a coil-wound former slidable freely in the air gap of said assembly to effect axial movement of the stylus, during reciprocation thereof by the reciprocating member, character defining elements operable simultaneously and in synchronism with said reciprocating member to control operation of the actuating means, and selector means to select a character defining element to control the actuating means.

13. For defining on impression receiving material, e. g. paper, characters each having a predetermined maximum height and maximum width, apparatus comprising a thin steel stylus supported for axial movement, a platen towards which said stylus is axially movable, a reciprocating member engaging the stylus at a position adjacent to the marking end thereof and reciprocating said marking end lengthwise of the platen in a path which determines one maximum dimension of a character, feeding means to feed impression receiving material between the platen and stylus with a linear speed determining the other maximum dimension of the character, a restraining element co-operating with the stylus to restrain against substantial movement, other than axial, portions of the stylus other than the marking end thereof, actuating means including a permanent magnet assembly having a coil-wound former slidable freely in the air gap of said assembly to effect axial movement of the stylus during reciprocation thereof by the reciprocating member, a plurality of character determining discs one for each character to be defined, simultaneously rotatable about an axis common thereto, means to rotate said discs in synchronism with the movements of said reciprocating member, electrical contacts spaced around the periphery of each said disc to determine the intervals at which electrical impulses are imparted to said coil-wound former, selector means including electrical elements to determine which character determining disc is conditioned to transmit an electrical impulse to said former, and a pair of electrical brushes engaging the periphery of each said disc, one brush of each pair being connected to earth and the other to said coil-wound former through said electrical elements.

14. For defining on impression receiving material, e. g. paper, characters each having a predetermined maximum height and maximum width, apparatus comprising a thin steel stylus supported for axial movement, a platen towards which said stylus is axially movable, a reciprocating member engaging the stylus at a position adjacent to the marking end thereof and reciprocating said marking end lengthwise of the platen in a path which determines one maximum dimension of a character, feeding means to feed impression receiving material between the platen and stylus with a linear speed determining the other maximum dimension of the character, means to interpose transfer media between the marking end of the stylus and impression receiving material fed by said feeding means, a restraining element co-operating with the stylus to restrain against substantial movement, other than axial, portions of the stylus other than the marking end thereof, actuating means to effect said axial movement of the stylus during reciprocation thereof by the reciprocating member, and a character defining element operable in synchronism with the reciprocating member to control operation of the actuating means.

15. For defining on impression receiving material, e. g. paper, characters each having a predetermined maximum height and maximum width, apparatus comprising a thin steel stylus supported for axial movement, a platen towards which said stylus is axially movable, a reciprocating member engaging the stylus at a position adjacent to the marking end thereof and reciprocating said marking and lengthwise of the platen in a path which determines one maximum dimension of a character, feeding means to feed impression receiving material between the platen and stylus with a linear speed determining the other maximum dimension of the character, means to interpose transfer media between the marking end of the stylus and impression receiving material fed by said feeding means, a restraining element co-operating with the stylus to restrain against substantial movement, other than axial, portions of the stylus other than the marking end thereof, actuating means including a permanent magnet assembly having a coil-wound former slidable freely in the air gap of said assembly to effect axial movement of the stylus during reciprocation thereof by the reciprocating member, character defining elements operable simultaneously and in synchronism with said reciprocating member to control operation of the actuating means, and selector means to select a character defining element to control the actuating means.

16. For definding on impression receiving material, e. g. paper, characters each having a predetermined maximum height and maximum width, apparatus comprising a thin steel stylus supported for axial movement, a platen towards which said stylus is axially movable, a reciprocating member engaging the stylus at a position adjacent to the marking end thereof and reciprocating said marking end lengthwise of the platen in a path which determines one maximum dimension of a character, feeding means to feed impression receiving material between the platen and stylus with a linear speed determining the other maximum dimension of the character, a marking ribbon disposed between the marking end of the stylus and impression receiving material fed by said feed means and movable in the same direction as and in timed relation with the impression receiving material, a restraining element cooperating with the stylus to restrain against substantial movement, other than axial, portions of the stylus other than the marking end thereof, actuating means to effect said axial movement of the stylus during reciprocation thereof by the reciprocating member, and a character defining element operable in synchronism with the reciprocating member to control operation of the actuating means.

17. For defining on impression receiving material, e. g. paper, characters each having a predetermined maximum height and maximum width, apparatus comprising a thin steel stylus supported for axial movement, a platen towards which said stylus is axially movable, a reciprocating member engaging the stylus at a position adjacent to the marking end thereof and reciprocating said marking end lengthwise of the platen in a path which determines one maximum dimension of a character, feeding means to feed impression receiving material between the platen and stylus with a linear speed determining the other maximum dimension of the character, a marking ribbon disposed between the marking end of the stylus and impression receiving material fed by said feeding means and movable in the same direction as and in timed relation with the impression receiving material, a restraining element cooperating with the stylus to restrain against substantial movement, other than axial, portions of the stylus other than the marking end thereof, actuating means including a permanent magnet assembly having a coil-wound former slidable freely in the air gap of said assembly to effect axial movement of the stylus during reciprocation thereof by the reciprocating member, character defining elements operable simultaneously and in synchronism with said reciprocating member to control operation of the actuating means, and selector means to select a character defining element to control the actuating means.

References Cited in the file of this patent
UNITED STATES PATENTS

| Number | Name | Date |
|---|---|---|
| 1,064,805 | Wood | June 17, 1913 |
| 2,264,615 | Bryce | Dec. 2, 1941 |
| 2,461,412 | Dickinson | Feb. 8, 1949 |
| 2,575,017 | Hunt | Nov. 13, 1951 |